United States Patent Office 3,256,308
Patented June 14, 1966

3,256,308
2-METHYL-1,3-DIOXA-2-SILA-CYCLOHEPT-5-ENE
George B. Sterling, Midland, and Chester E. Pawloski, Bay City, Mich., assignors to The Dow Chemical Company, Midland, Mich., a corporation of Delaware
No Drawing. Filed Mar. 5, 1962, Ser. No. 177,186
3 Claims. (Cl. 260—448.8)

The present invention is directed to compounds corresponding to the formula:

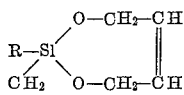

In this and succeeding formulae, R represents methyl, ethyl or vinyl. These compounds are liquid materials which are somewhat soluble in many common organic solvents and of low solubility in water. They are useful as parasiticides for the control of insects, worms, trash fish and fungal and bacterial organisms. They are also useful in the manufacture of improved latex polymers and vinyl rubber products such as copolymers with butadiene. The latexes and vinyl rubber products are found to have very desirable and improved tensile, lubricous, soft and elastic properties.

The novel compounds are prepared by reacting 2-butene-1,4-diol with a silane compound having the formula:

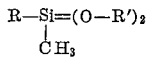

wherein R' represents alkyl containing up to four carbon atoms. The reaction is carried out in the presence of a small and catalytic amount of an acidic catalyst such as sulfuric acid, trichloroacetic acid, phosphoric acid, dichloroacetic acid and so forth. Good results are obtained when employing substantially equimolecular proportions of the reagents and a catalytic amount of the acid catalyst. The reaction conveniently is carried out in an organic liquid as reaction medium and takes place readily at temperatures of from 10° to 100° C. In carrying out the reaction, the butenediol and silane compound are mixed together with a catalytic amount of the acid catalyst and the resulting mixture maintained for a short period in the reaction temperature range. Upon completion of the reaction, the reaction mixture is fractionally distilled under reduced pressure to separate the desired product as a liquid material.

The following examples merely illustrate the invention and are not to be construed as limiting.

*Example 1.—2,2-dimethyl-1,3-dioxa-2-sila-cyclohept-5-ene*

2-Butene-1,4-diol (88 grams; 1 mole) and 148 grams (1 mole) of dimethyl diethoxy silane were mixed together with stirring in 100 milliliters of benzene containing a few drops of concentrated sulfuric acid. During the stirring operation, which was carried out at room temperature, a reaction took place with the formation of a single liquid phase. The reaction mixture was thereafter distilled at a 3:1 reflux ratio until the pot temperature reached about 115° C. after which it was allowed to cool. A small amount of sodium carbonate was then added to the mixture and the distillation completed under vacuum to obtain a 2,2-dimethyl-1,3-dioxa-2-sila-cyclohept-5-ene product as a liquid material. This product boiled at 73° C. at 33 millimeters pressure and had a refractive index n/D of 1.4373 at 25° C. and carbon and hydrogen contents of 48.05 and 8.24, respectively, as compared to theoretical contents of 50 and 8.4 percent.

*Example 2.—2-methyl-2-vinyl-1,3-dioxa-2-sila-cyclohept-5-ene*

Butene-1,4-diol (46 grams; 0.5 mole), 80 grams (0.5 mole) of methyl vinyl diethoxy silane, 100 milliliters of benzene and a few drops of concentrated sulfuric acid were mixed together with stirring at room temperature. During the stirring, a reaction took place resulting in the formation of a single liquid phase. The reaction mixture was thereafter fractionally distilled under reduced pressure to obtain a 2-methyl-2-vinyl-1,3-dioxa-2-sila-cyclohept-5-ene product as a liquid material boiling at 83° C. at 47 millimeters pressure and having a refractive index n/D of 1.4548 at 25° C.

In an exactly analogous operation, 1 mole quantities of 2-butene-1,4-diol and methyl ethyl dibutoxy silane are reacted together in 200 milliliters of benzene containing a few drops of concentrated sulfuric acid to obtain a 2-methyl - 2 - ethyl - 1,3 - dioxa - 2 - sila - cyclohept - 5-ene product as a liquid material.

The dialkyl ethers of the silane diols, to be employed as starting materials in accordance with the present teachings, are prepared by known methods as described in British Patent 573,906.

The new compounds of the present invention have been found to be useful as parasiticides and as constituents in latex polymers and vinyl rubber products. For parasiticidal use, the products are dispersed on a finely divided solid and employed as dusts. Also, such mixtures may be dispersed in water with the aid of a wetting agent and the resulting aqueous suspensions employed as sprays. In other procedures, the products are employed as constituents of solvent solutions, oil-in-water or water-in-oil emulsions or water dispersions with or without the addition of wetting, dispersing and emulsifying agents. In a representative operation, aqueous compositions containing 2,000 parts per million by weight of 2,2-dimethyl-1,3-dioxa-2-sila-cyclohept-5-ene give substantially complete controls of two-spotted spider mites.

What is claimed is:
1. A compound having the formula:

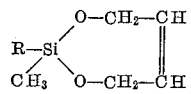

wherein R represents a member of the group consisting of methyl, ethyl and vinyl.
2. 2,2-Dimethyl-1,3-dioxa-2-sila-cyclohept-5-ene.
3. 2-Methyl-2-vinyl-1,3-dioxa-2-sila-cyclohept-5-ene.

References Cited by the Examiner

UNITED STATES PATENTS

| | | | |
|---|---|---|---|
| 2,386,793 | 10/1945 | Hanford | 260—448.8 |
| 2,441,066 | 5/1948 | Hanford | 260—448.8 |
| 3,065,254 | 11/1962 | Silva | 260—448.8 |

OTHER REFERENCES

Krieble et al., "Jour. Am. Chem. Soc." volume 69, November 1947, pages 2689–92.

Staudinger et al., "Makromolekulare Chemie," vol. 11, October 1953, pp. 24 to 50, pp. 24, 30 to 31 and 41 to 44 relied upon.

TOBIAS E. LEVOW, *Primary Examiner.*

S. H. BLECH, P. D. FREEDMAN, J. G. LEVITT,
*Assistant Examiners.*